United States Patent
Ferg et al.

(10) Patent No.: US 9,483,627 B1
(45) Date of Patent: Nov. 1, 2016

(54) ABSTRACTING CREDENTIALS FOR MOBILE CLIENT AUTHENTICATION

(75) Inventors: Barry Ferg, North Vancouver (CA); Gary Krall, Saratoga, CA (US); Nicolas Popp, Menlo Park, CA (US); Robert Koeten, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 346 days.

(21) Appl. No.: 13/463,749

(22) Filed: May 3, 2012

Related U.S. Application Data

(60) Provisional application No. 61/482,191, filed on May 3, 2011.

(51) Int. Cl.
*G06F 7/04* (2006.01)
*G06F 21/31* (2013.01)
*H04L 29/06* (2006.01)

(52) U.S. Cl.
CPC ............... *G06F 21/31* (2013.01); *H04L 63/08* (2013.01)

(58) Field of Classification Search
CPC .............................. G06F 21/31; H04L 63/083
USPC .......................................... 726/2, 4–6, 18, 21
See application file for complete search history.

(56) References Cited

U.S. PATENT DOCUMENTS

| | | | |
|---|---|---|---|
| 2007/0211716 A1* | 9/2007 | Oz et al. | 370/389 |
| 2008/0066172 A1* | 3/2008 | Tarsi | 726/9 |
| 2008/0320310 A1* | 12/2008 | Florencio et al. | 713/184 |
| 2010/0199086 A1* | 8/2010 | Kuang et al. | 713/155 |

* cited by examiner

*Primary Examiner* — Anthony Brown
(74) *Attorney, Agent, or Firm* — Lowenstein Sandler LLP

(57) ABSTRACT

A computing system receives an authentication request from a user device for access to a web application hosted in a cloud and determines that the authentication request is a candidate for modification based on initial user credentials in the authentication request. The computing system modifies the authentication request to include replacement user credentials that correspond to the initial user credentials and transmits the modified authentication request to the web application in the cloud. The web application determines whether the modified authentication request is valid based on the replacement user credentials.

18 Claims, 4 Drawing Sheets

US 9,483,627 B1

ABSTRACTING CREDENTIALS FOR MOBILE CLIENT AUTHENTICATION

RELATED APPLICATIONS

This application is related to and claims the benefit of U.S. Provisional Patent Application No. 61/482,191 filed May 3, 2011, which is hereby incorporated by reference herein.

TECHNICAL FIELD

Embodiments of the present disclosure relate to mobile client authentication and, more particularly, to a technique of abstracting credentials for mobile client authentication.

BACKGROUND

A business, corporation, and/or company, is commonly referred to as an Enterprise. Cloud computing is generally becoming the platform of choice for Enterprises that want to reduce operating expenses and be able to scale resources rapidly. "Clouds" may be provided by different cloud providers to provide Enterprises access of computing resources over a computer network. Clouds can provide Software-as-a-Service (SaaS), sometimes referred to as "on-demand software," to various Enterprises. SaaS is a software delivery model in which software and its associated data are hosted centrally, typically in a cloud, and are accessed by user using, for example, a web browser, over the Internet. SaaS has become a common delivery model for most business applications, such as customer relationship management (CRM). Security is becoming a very important factor in a SaaS environment. Mobile devices typically embed user credentials (e.g., user identifier, password), for example, for accessing a cloud with the mobile device. The mobile devices may not have adequate security measures to prevent the user credentials from being captured and misappropriated.

SUMMARY

In one embodiment, a system for abstracting credentials for mobile client authentication is described. An exemplary system may include a memory and a processor that is coupled to the memory. In one embodiment, the system receives an authentication request from a user device for access to a web application hosted in a cloud. The system determines that the authentication request is a candidate for modification based on initial user credentials in the authentication request and modifies the authentication request to include replacement user credentials that correspond to the initial user credentials. The system transmits the modified authentication request to the web application in the cloud. The web application determines whether the modified authentication request is valid based on the replacement user credentials.

In one embodiment, the initial user credentials are Virtual Private Network (VPN) credentials. In one embodiment, the system modifies the authentication request by locating the replacement user credentials that correspond to the initial user credentials in a data store that is coupled to the system and replaces the initial user credentials in the authentication request with the corresponding replacement user credentials. In one embodiment, the replacement user credentials are a different format from the initial user credentials. In one embodiment, the replacement user credentials are a same format as the initial user credentials. In one embodiment, the system receives the authentication request from the user device via a VPN. In one embodiment, the system receives the authentication request from the user device by intercepting the authentication based on a VPN configuration of the user device.

In additional embodiments, methods for performing the operations of the above described embodiments are also implemented. Additionally, in embodiments of the present disclosure, a non-transitory computer readable storage medium stores methods for performing the operations of the above described embodiments.

BRIEF DESCRIPTION OF THE DRAWINGS

Various embodiments of the present disclosure will be understood more fully from the detailed description given below and from the accompanying drawings of various embodiments of the disclosure.

DETAILED DESCRIPTION

Embodiments of the invention are directed to a method and system for abstracting credentials for mobile client authentication. A computing system receives an authentication request from a user device for access to a web application hosted in a cloud and determines that the authentication request is a candidate for modification based on initial user credentials in the authentication request. The computing system modifies the authentication request to include replacement user credentials that correspond to the initial user credentials and transmits the modified authentication request to the web application in the cloud. The web application determines whether the modified authentication request is valid based on the replacement user credentials.

Embodiments of the invention provide protection of user credentials when users access data at a cloud using a mobile device. Embodiments provide an abstraction layer to abstract the user credentials embedded in a mobile device by replacing the user credentials at a proxy.

Figure 1:
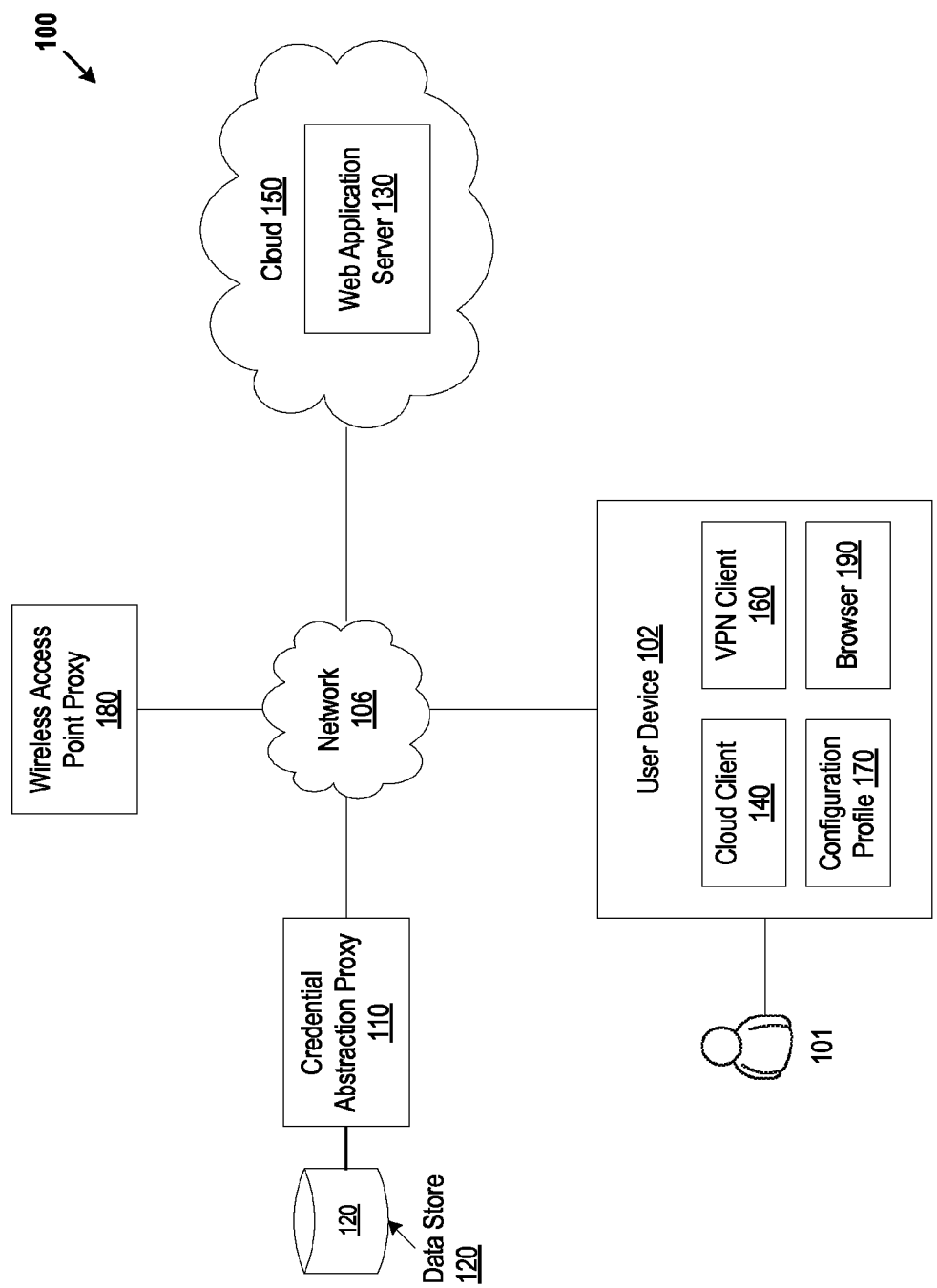
FIG. 1 illustrates exemplary system architecture, in accordance with various embodiments of the present disclosure.

FIG. 1 is a block diagram of an exemplary network architecture 100 in which embodiments of the present invention can be implemented. The network architecture 100 can include one or more user devices 102 communicating with one or more clouds 150 via a network 106. The network 106 can be a local area network (LAN), a wireless network, a mobile communications network, a wide area network (WAN), such as the Internet, or similar communication system, and can include any number of networking and computing devices such as wired and wireless devices. The network 106 can be a wireless network not previously used by the user device 102 and/or where the user device 102 has not been configured to use.

Wi-Fi is a technology that allows an electronic device to exchange data wirelessly over a network. A user device 102 can be a device that can use Wi-Fi to connect to a network resource, such as the Internet, via a wireless access point proxy 180. The user device 102 can be portable computing devices such as, and not limited to, laptop or tablet computers, cellular telephones (e.g., smartphones), personal digital assistants (PDAs), portable media players, netbooks, and the like. The user devices 102 can be non-portable computing devices such as, and not limited to, desktop computers, set-top boxes associated with a television, gaming consoles, and so on. The user devices 102 can be variously configured with different features to enable access to various web applications hosted by one or more web application server 130 in a cloud 150.

A wireless access point (WAP) proxy 180 allows the user device 102 to connect to a wired network using Wi-Fi, or related standards. The wireless access point proxy 180 can be hosted by any type of computing device including server computers, gateway computers, desktop computers, laptop computers, or similar computing device. The wireless access point proxy 180 can create a hotspot, which is a site that offers Internet access over a wireless local area network through the use of a router connected to a link to an Internet service provider. Hotspots typically use Wi-Fi technology. Hotspots may be found in hotels, airports, coffee shops, retailers, and various other public establishments throughout much of the developed world. The wireless access point proxy 180 may be provided by and maintained by a third party (e.g., hotels, airports, coffee shops, retailers, various other public establishments).

In one embodiment, a user 101 is authenticated with the WAP proxy 180 via credentials (e.g., user identifier, password) and a browser 190 on the user device 102. The user 101 can use the Wi-Fi connection established with the WAP proxy 180 to establish a Virtual Private Network (VPN) connection, for example to an Enterprise network. A VPN is a secure network that uses primarily public telecommunication infrastructures, such as the Internet, to provide remote offices or traveling users (e.g., user 101) an access to a central organizational network (e.g., Enterprise network).

User credentials (e.g., user identifier, password), for example, for accessing a cloud may be embedded in a user device 102. In one embodiment, the user device 102 is configured to use a VPN defined in a configuration profile 170 stored in the user device 102. In one embodiment, the configuration profile 170 is an XML file built using a user device 102 configuration utility. The configuration utility can contain, for example, user device 102 security policies and restrictions, VPN configuration information, Wi-Fi settings, email and calendar accounts, and authentication credentials, for example, that permit a user device 102 to work with Enterprise systems. The configuration utility can be executed to load settings and authorization information onto the user device 102. The configuration utility can be distributed via the web or email. For example, a user 101 may open an email attachment via the user device 102 or download the configuration profile 170 using, for example, the browser 190, on the user device 102, to trigger VPN user device configuration process to create the configuration profile 170 for the user device 102. A user 101 can authenticate with the VPN using VPN credentials (e.g., user identifier and password, certificate, etc.) to establish a VPN connection.

A cloud 150 can include one or more web application server computing systems 130 to host one or more web applications using cloud computing. The server computing systems 130 are controlled by a cloud service provider and not an enterprise. An enterprise as referred to herein can represent any organization including, for example, a business organization such as a corporation, an educational institution such as a college and university, etc. The cloud 150 can use a Software-as-a-Service (SaaS) model in which cloud computing companies provide software functionality, for example, to Enterprise users 101 on a subscription basis via the web application servers 130 in the cloud 150. Examples of web applications are business applications running on the cloud and including, for example, accounting, collaboration, customer relationship management (CRM), enterprise resource planning (ERP), invoicing, human resource management (HRM), content management (CM), and service desk management. The web application servers 130 can be hosted by any type of computing device including server computers, gateway computers, desktop computers, laptop computers, or similar computing device. The web applications can use HTTP or HTTPS connections.

The user 101 can send an authentication request to authenticate with a web application server 130 in the cloud 150 to access a cloud web application (e.g., CRM application). The user device 102 can run a cloud client 140 while connected to the VPN to send the authentication request. The cloud client 140 can use a cloud HTTP application program interface (API) to send an authentication request that includes the user credentials (e.g., username, password) of the user 101, for example, that are embedded in a user device 102, to the web application server 130 in the cloud 150. Examples of a cloud client 140 include, and are not limited to, a desktop web browser, a mobile device web browser, a mobile device application, a cloud connector plugin (e.g., cloud email connector plugin), a link (e.g., URL in an email), etc.

The user credentials in the authentication request are susceptible to being captured or misappropriated, for example, by a user (e.g., attacker). The network architecture 100 can include a credential abstraction proxy 110 to intercept the authentication request sent by the user device 102 and modify the authentication request to replace the initial user credentials (e.g., user identifier, password), which may have been captured and misappropriated, in the authentication request with replacement user credentials that are stored in a data store 120 that is coupled to the credential abstraction proxy 110. The credential abstraction proxy 110 can use the VPN to intercept the authentication request and rewrite the user credentials. The configuration profile 170 can cause the authentication request sent by the user device 102 to be routed to the credential abstraction proxy 110. In one embodiment, proxies and/or custom DNS solutions are part of the VPN DHCP profile of the user device 102. In one embodiment, additional client software can be included in a user device to cause the authorization request to be redirected to the credential abstraction proxy 110.

The credential abstraction proxy 110 can recognize and divert inbound authentication requests for specific web application domains in order to rewrite the inbound authentication request to abstract the user credentials in the request prior to passing the inbound authentication request to the web application server 130 in the cloud 150. The credential abstraction proxy 110 can be configured to communicate with a provisioning interface (e.g., SSO interface, Security Assertion Markup Language (SAML) interface) at the cloud 150. The credential abstraction proxy 110 may reside on a machine (e.g., server computers, desktop computers, etc.). The credential abstraction proxy 110 may be maintained by an organization (e.g., business, company). In another embodiment, the credential abstraction proxy 110 may be maintained by a third party.

Figure 2:
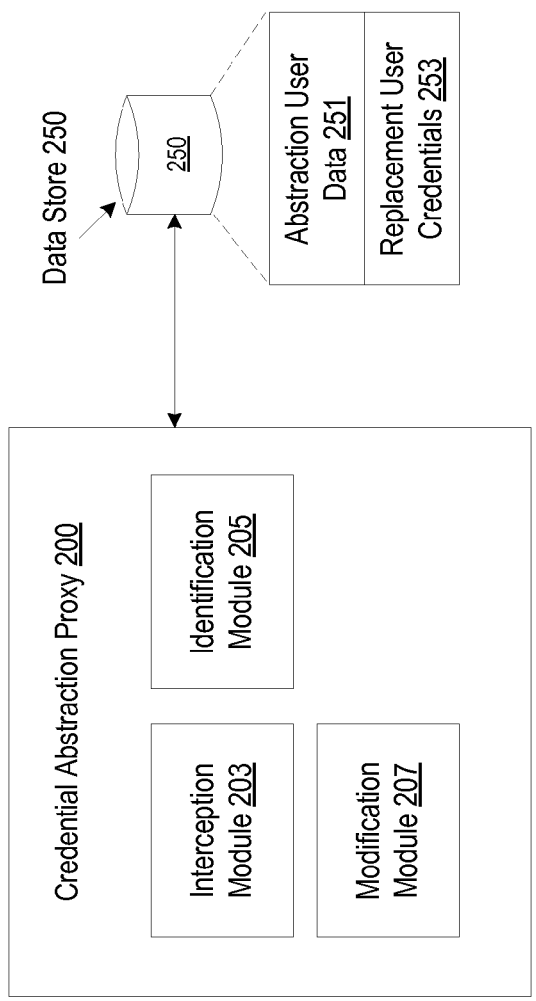
FIG. 2 is a block diagram of a credential abstraction proxy, in accordance with some embodiments.

FIG. 2 is a block diagram of a credential abstraction proxy 200, in accordance with some embodiments. The credential abstraction proxy 200 may be the same as the credential abstraction proxy 200 in FIG. 1. The credential abstraction proxy 200 includes an interception module 203, an identification module 205, and a modification module 207. Note that in alternative embodiments, the functionality of the interception module 203, the identification module 205, and the modification module 207 may be combined or divided.

The interception module 203 can intercept an authentication request sent by a user device (e.g., user device 102 in FIG. 1). The authentication request can be a request to be authenticated for access to a web application hosted by a cloud. The configuration profile in a user device can cause the authentication request to be routed to the credential abstraction proxy. Certain types of VPN clients configured in the configuration profile of a user device may be set to be active for requests from specified domains. The interception module 203 can intercept traffic intended for a particular cloud domain.

The identification module 205 can determine whether the intercepted authentication request is a candidate for modification. The identification module 205 identifies whether the authentication request corresponds to requests of users that should have their user credentials re-written to provide a layer of abstraction. The identification module 205 can access abstraction user data 251 in a data store 250 that is coupled to the identification module 205 to determine whether the authentication request should be modified. The abstraction user data 251 can include user credentials associated with requests to be modified. The identification module 205 can search the abstract user data 251 for user credentials that match the user credentials in the intercepted authentication request. If there are no credentials in the abstraction user data 251 that match, the identification module 205 can transmit the unmodified authentication request to the web application server in the cloud. In one embodiment, the identification module 205 can apply a policy (e.g., data loss protection policy, access policy, etc.) prior to sending the unmodified authentication request to the web application server in the cloud.

The modification module 207 can modify an intercepted authentication request and transmit the modified authentication request to the web application server in the cloud. In one embodiment, the modification module 207 can apply a policy (e.g., data loss protection policy, access policy, etc.) prior to sending the modified authentication request to the web application server in the cloud. The modification module 207 can search replacement user credentials 253 stored in the data store 250 for user credentials that match the user credentials in the intercepted authentication request. The data store can store mapping data that maps initial user credentials (e.g., user credentials in an intercepted authentication request) to replacement user credentials. The replacement user credentials 253 can be user provided. The modification module 207 can replace the initial user credentials in the authentication request with the corresponding replacement user credentials 253 and transmit the modified request to the web application server in the cloud.

A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 3:
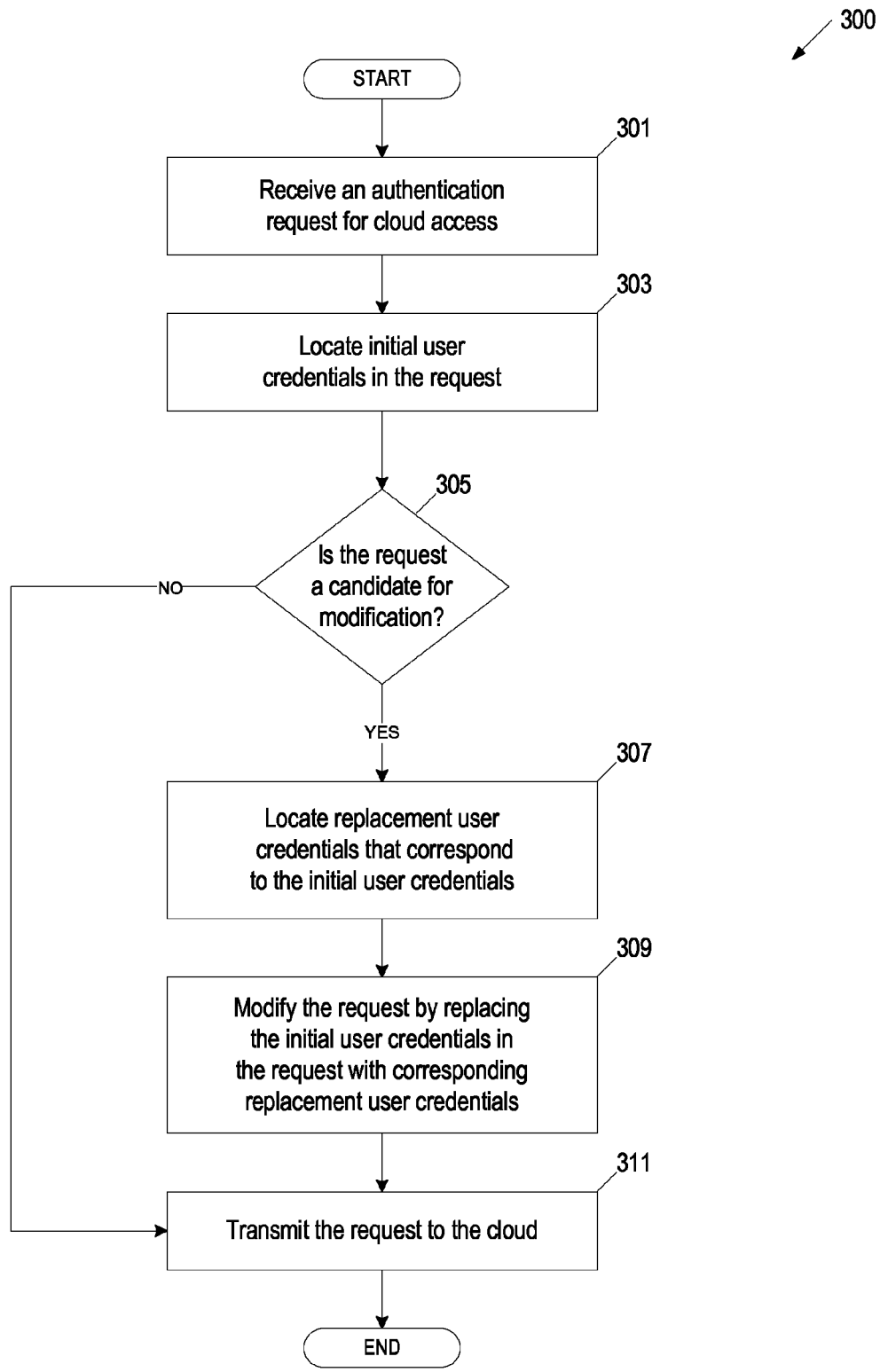
FIG. 3 is a flow diagram of an embodiment of a method for abstracting credentials for mobile client authentication.

FIG. 3 is a flow diagram of an embodiment of a method 300 abstracting credentials for mobile device authentication. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by a credential abstraction proxy 110 of FIG. 1.

At block 301, processing logic receives an authentication request from a user device for access to a cloud. The authentication request is a request to be authenticated by a web application server in a cloud for access to the web application hosted by the cloud. In one embodiment, processing logic intercepts the authentication request via the configuration of the user device to use a VPN defined in a configuration profile stored in the user device. In one embodiment, the authentication request is a HTTP authentication request. In another embodiment, the authentication request are parameters in a GET URL or a POST encoded form.

At block 303, processing logic locates initial user credentials in the authentication request. In one embodiment, the initial user credentials are VPN credentials. Examples of VPN credentials can include, and are not limited to, a user identifier and a password, and a client certificate. At block 305, processing logic determines whether the authentication request is a candidate for modification based on the initial user credentials in the request. Processing logic can search abstraction user data in a data store that is coupled to the credential abstraction module for credentials that match the initial user credentials in the request. If there are no credentials in the abstraction user data that match (block 305), processing logic transmits the authentication request to the cloud at block 311. If there are credentials in the abstraction user data that match (block 305), processing logic locates replacement user credentials that correspond to the initial user credentials in the data store at block 311. In one embodiment, the replacement user credentials are in the same format (e.g., first factor credentials, second factor credentials) as the initial user credentials. In another embodiment, the replacement user credentials are in a different format (e.g., first factor credentials, second factor credentials) than the initial user credentials. Examples of first factor credentials can include, and are not limited to, user identifier and passwords. Examples of second factor credentials, can include, and are not limited to, one-time password (OTP), a digital certificate (e.g., public key infrastructure (PKI) certificate), a fingerprint, etc.

At block 309, processing logic modifies the authentication request by replacing the initial user credentials in the request with the corresponding user credentials and transmits the modified request to the cloud at block 311. The cloud can validate the authentication request based on the replacement user credentials in the modified request.

Figure 4:
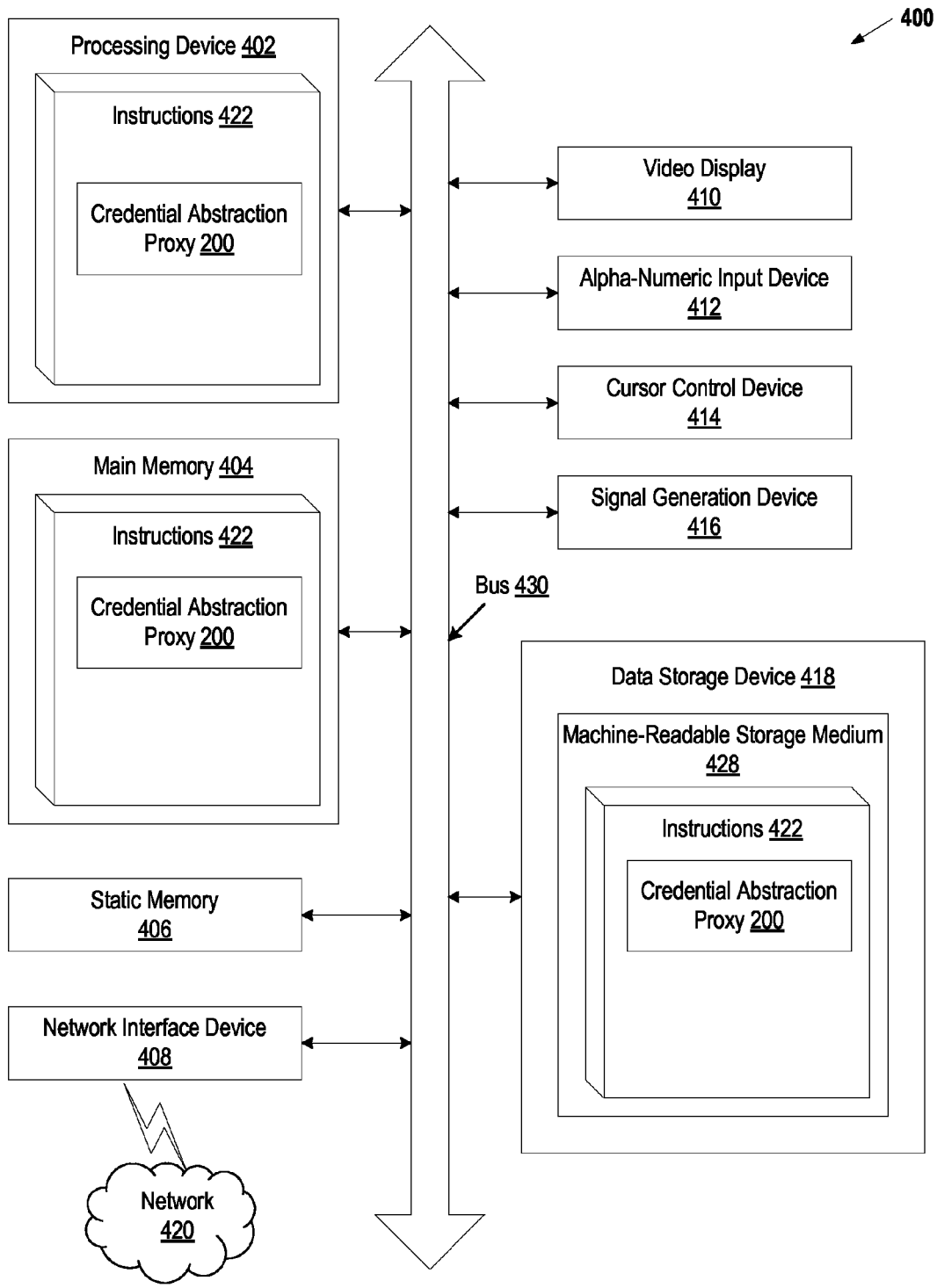
FIG. 4 is a block diagram of an exemplary computer system that may perform one or more of the operations described herein.

FIG. 4 illustrates a diagram of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 730.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 428 on which is stored one or more sets of instructions 422 (e.g., software) embodying any one or more of the methodologies or functions described herein. The instructions 422 may also reside, completely or at least partially, within the main memory 404 and/or within the processor 402 during execution thereof by the computer system 400, the main memory 404 and the processor 402 also constituting computer-readable storage media. The instructions 422 may further be transmitted or received over a network 420 via the network interface device 408.

In one embodiment, the instructions 422 include instructions for a credential abstraction proxy (e.g., credential abstraction proxy 200 of FIG. 2) and/or a software library containing methods that call credential abstraction proxy. While the computer-readable storage medium 428 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "modifying", "transmitting", "locating," "replacing," "intercepting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a proxy server computer, an authentication request from a mobile user device for access to a web application hosted in a cloud, wherein the authentication request comprises initial user credentials that are embedded in the mobile user device, and wherein the authentication request to the web application is routed to the proxy server computer via a Virtual Private Network (VPN) in view of a configuration profile of the mobile user device indicating that requests from a specific domain be routed to the proxy server computer;
    determining that the authentication request is a candidate for modification based on the initial user credentials in the authentication request;
    modifying, by the proxy server computer, the authentication request to include replacement user credentials that correspond to the initial user credentials; and
    transmitting the modified authentication request to the web application in the cloud, wherein the web application determines whether the modified authentication request is valid based on the replacement user credentials.

2. The method of claim 1, wherein the initial user credentials are Virtual Private Network credentials.

3. The method of claim 1, wherein modifying the authentication request comprises:
    locating the replacement user credentials that correspond to the initial user credentials in a data store that is coupled to the proxy server computer; and
    replacing the initial user credentials in the authentication request with the corresponding replacement user credentials.

4. The method of claim 1, wherein the replacement user credentials are in a different format from the initial user credentials.

5. The method of claim 1, wherein the replacement user credentials are in a same format as the initial user credentials.

6. The method of claim 1, wherein receiving the authentication request from the mobile user device comprises:
    intercepting the authentication based on a Virtual Private Network configuration of the mobile user device.

7. A system comprising:
    a memory; and
    a processing device coupled with the memory to:
        receive, by a proxy server computer executing the processing device, an authentication request from a mobile user device for access to a web application hosted in a cloud, wherein the authentication request comprises initial user credentials that are embedded in the mobile user device, and wherein the authentication request to the web application is routed to the proxy server computer via a Virtual Private Network (VPN) in view of a configuration profile of the mobile user device indicating that requests from a specific domain be routed to the proxy server computer;
        determine that the authentication request is a candidate for modification based on the initial user credentials in the authentication request;
        modify the authentication request to include replacement user credentials that correspond to the initial user credentials; and
        transmit the modified authentication request to the web application in the cloud, wherein the web application determines whether the modified authentication request is valid based on the replacement user credentials.

8. The system of claim 7, wherein the initial user credentials are Virtual Private Network credentials.

9. The system of claim 7, wherein the processing device is to modify the authentication request by:
    locating the replacement user credentials that correspond to the initial user credentials in a data store that is coupled to the processing device; and
    replacing the initial user credentials in the authentication request with the corresponding replacement user credentials.

10. The system of claim 7, wherein the replacement user credentials are a different format from the initial user credentials.

11. The system of claim 7, wherein the replacement user credentials are a same format as the initial user credentials.

12. The system of claim 7, wherein the processing device is to receive the authentication request from the mobile user device by:
    intercepting the authentication based on a Virtual Private Network configuration of the mobile user device.

13. A non-transitory computer readable storage medium including instructions that, when executed by a processing device, cause the processing device to perform a method comprising:
    receiving, by a proxy server computer executing the processing device, an authentication request from a mobile user device for access to a web application hosted in a cloud, wherein the authentication request comprises initial user credentials that are embedded in the mobile user device, and wherein the authentication request to the web application is routed to the proxy server computer via a Virtual Private Network (VPN) in view of a configuration profile of the mobile user device indicating that requests from a specific domain be routed to the proxy server computer;
    determining that the authentication request is a candidate for modification based on the initial user credentials in the authentication request;
    modifying the authentication request to include replacement user credentials that correspond to the initial user credentials; and
    transmitting the modified authentication request to the web application in the cloud, wherein the web application determines whether the modified authentication request is valid based on the replacement user credentials.

14. The non-transitory computer readable storage medium of claim 13, wherein the initial user credentials are Virtual Private Network credentials.

15. The non-transitory computer readable storage medium of claim 13, wherein modifying the authentication request comprises:
   locating the replacement user credentials that correspond to the initial user credentials in a data store that is coupled to the processing device; and
   replacing the initial user credentials in the authentication request with the corresponding replacement user credentials.

16. The non-transitory computer readable storage medium of claim 13, wherein the replacement user credentials are a different format from the initial user credentials.

17. The non-transitory computer readable storage medium of claim 13, wherein the replacement user credentials are a same format as the initial user credentials.

18. The non-transitory computer readable storage medium of claim 13, wherein receiving the authentication request from the mobile user device comprises:
   intercepting the authentication via the Virtual Private Network and based on a Virtual Private Network configuration of the mobile user device.

* * * * *